(12) United States Patent
Park

(10) Patent No.: US 6,430,187 B1
(45) Date of Patent: Aug. 6, 2002

(54) PARTITIONING OF SHARED RESOURCES AMONG CLOSED USER GROUPS IN A NETWORK ACCESS DEVICE

(75) Inventor: Jae Park, Ossining, NY (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/325,185

(22) Filed: Jun. 3, 1999

(51) Int. Cl.[7] .............................. H04L 12/56; H04J 3/24
(52) U.S. Cl. ...................... 370/397; 370/412; 370/466; 370/474
(58) Field of Search ................................ 370/389, 395, 370/397, 399, 401, 412, 465–466, 474

(56) References Cited

U.S. PATENT DOCUMENTS

| 5,793,747 A | | 8/1998 | Richard Kline | ............. 370/230 |
| 5,818,842 A | * | 10/1998 | Burwell et al. | ............. 370/412 |
| 6,157,614 A | * | 12/2000 | Pasternak et al. | ........... 370/236 |
| 6,249,528 B1 | * | 6/2001 | Kothary | ...................... 370/466 |

FOREIGN PATENT DOCUMENTS

EP     0 847 168 A2     10/1998

OTHER PUBLICATIONS

Toshiba Corporation "TC35854F—ATM 155Mb/s SAR Chip" Preliminary Functional Specification, pp. 0–20, 34–35, 41, 83–91, 107–109, 119–120, 164–165 Feb. 7, 1998.

Toshiba Corporation "TC358541F—ATM 155Mb/s SAR Chip" Preliminary Functional Specification, pp. 34–35, 90, 112–113, 124–125, 185–189, Mar. 18, 1999.

Toshiba Corporation "TC358541F—ATM 155Mb/s SAR Chip" Preliminary Functional Specification, pp. 0–20, 34–35, 41, 83–91, 107–109, 119–120, 164–165 Feb. 27, 1998.

* cited by examiner

Primary Examiner—Wellington Chin
Assistant Examiner—Maikhanh Tran
(74) Attorney, Agent, or Firm—Weingarten, Schurgin, Gagnebin & Lebovici LLP

(57) ABSTRACT

A network access device includes a cell buffer memory (54) and segmentation and reassembly (SAR) logic (40) between multiple local area network (LAN) interface logic blocks (33, 36) and logic (56) interfacing with a cell-based network such as ATM. The cell buffer memory can be programmably partitioned into distinct buffer regions, each being associated with a respective LAN and with a respective set of virtual connections on the cell-based network. The SAR logic segments received frames into groups of cells, stores each group of cells into the buffer region associated with the respective LAN, and transfers the groups of cells from each buffer region to the cell-based-network interface logic via the associated virtual connections. The SAR logic and the cell memory are shared among multiple LAN bridges implemented by the LAN interface logic blocks and the cell-based-network interface logic, while traffic from the different bridges is kept separate. The SAR logic also manages the network bandwidth assigned to the different bridges separately, so that traffic from one bridge generally does not affect another bridge's use of its allocated bandwidth.

4 Claims, 5 Drawing Sheets

PARTITIONING OF SHARED RESOURCES AMONG CLOSED USER GROUPS IN A NETWORK ACCESS DEVICE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to the field of data networks.

With the increasing use of Asynchronous Mode Transport (ATM) networks as high capacity, wide-area data transport networks, there has been an increased use of encapsulation and similar techniques to enable ATM networks to provide legacy services. For example, protocols such as the ATM Forum's Local Area Network (LAN) emulation standard are used to emulate a LAN over an ATM network. The emulated LAN uses well-established LAN protocols, such as the well-known Ethernet protocols, and is therefore capable of providing LAN services to a variety of existing customer equipment.

Typically, the ATM network and the legacy services or networks have fundamentally different data transport mechanisms. In ATM networks, data is transported in fixed-length units of 53 bytes called "cells". In contrast, many other networks employ variable-length data units, referred to herein as "frames". One basic process performed in equipment that provides frame-based services over an ATM network is the conversion between frames and corresponding groups of cells. The process of converting a frame to a group of cells is known as "segmentation", and the reverse process as "reassembly". Logic and/or software that performs the "segmentation and reassembly" or SAR function is ubiquitous in ATM network interface equipment.

The SAR function requires the use of segmentation buffers to temporarily store cells that have been created from received frames, before the cells are transmitted on the ATM network. The segmentation buffers are useful in the segmentation function per se, and they are useful for traffic management purposes as well. The segmentation buffers can absorb cells created from bursts of received frames during periods of reduced transmission capacity on the ATM network. The need to buffer cells can arise from situational circumstances, such as network congestion caused by temporary excess demand, or it may arise due to more deliberate actions, such as the explicit allocation of different priorities to different types of traffic or different customers. During periods of relatively heavy high-priority traffic, the cells of lower-priority traffic will tend to accumulate in the segmentation buffers. After some point, the buffers may become full, resulting in the undesirable discarding of low-priority frames. The threshold point at which frames from a given sender are discarded may be undesirably low if segmentation buffer space is too small, or if one or more high-volume data streams use more than their fair share of the space. In such a case, the quality of service experienced by customers whose frames are discarded can deteriorate to an unacceptable level.

Another feature of ATM networks is the existence of different classes of service. Network users can specify characteristics of their data traffic, and can subscribe for certain levels of network service. For example, a user may desire so-called Constant Bit Rate (CBR) service, which can be useful for real-time data such as video data. CBR service requirements in an ATM network are more stringent than other service classes, such as Available Bit Rate (ABR) or Unspecified Bit Rate (UBR).

In particular, the network attempts to provide different amounts of transmission bandwidth to customers based on subscribed service class. Network devices actively manage the transmission of data cells to achieve the desired allocation of bandwidth, both on a peak basis and on an average basis. It is possible in existing systems that high-volume users may use more than their fair share of transmission bandwidth, causing the quality of service experienced by other users to be degraded.

BRIEF SUMMARY OF THE INVENTION

In accordance with the present invention, techniques are disclosed in which the allocation of buffer space and bandwidth among different network customers connected to a network access device can be more explicitly controlled, enabling improved control over the quality of service experienced by each customer. Additionally, the disclosed techniques enable multiple logical entities, such as LAN bridges, to share a single set of physical resources, saving power, space and cost in network equipment.

According to one disclosed technique, a cell buffer memory is used with segmentation and reassembly (SAR) logic between multiple local area network (LAN) interface logic blocks, on the one hand, and logic interfacing with a cell-based network such as ATM, on the other hand. The cell buffer memory can be programmably partitioned into distinct buffer regions, each buffer region being associated with a respective LAN and with a respective set of virtual connections defined between the SAR logic and the cell-based-network interface logic. The SAR logic segments frames received from each LAN interface logic block into corresponding groups of cells, stores each group of cells into the buffer region associated with the respective LAN, and transfers the groups of cells from each buffer region to the cell-based-network interface logic via the virtual connections associated with the buffer region. The SAR logic and the cell memory are efficiently shared among multiple LAN bridges implemented by the LAN interface logic blocks and the cell-based-network interface logic. Traffic from the different bridges is kept separate, avoiding problems of security and diminished service quality.

According to a disclosed network traffic scheduling technique, the use of allocated transmission bandwidth by the different bridges is actively managed. The technique employs a transmit scheduling table whose entries contain an index value identifying a respective bridge. Each entry represents a cell send opportunity for the respective bridge. A schedule index is continually stepped through the table entries to select connections on which cells are to sent in accordance with a priority scheme reflected in the structure of the table.

Other aspects, features, and advantages of the present invention are disclosed in the detailed description that follows.

DETAILED DESCRIPTION OF THE INVENTION

Figure 1:
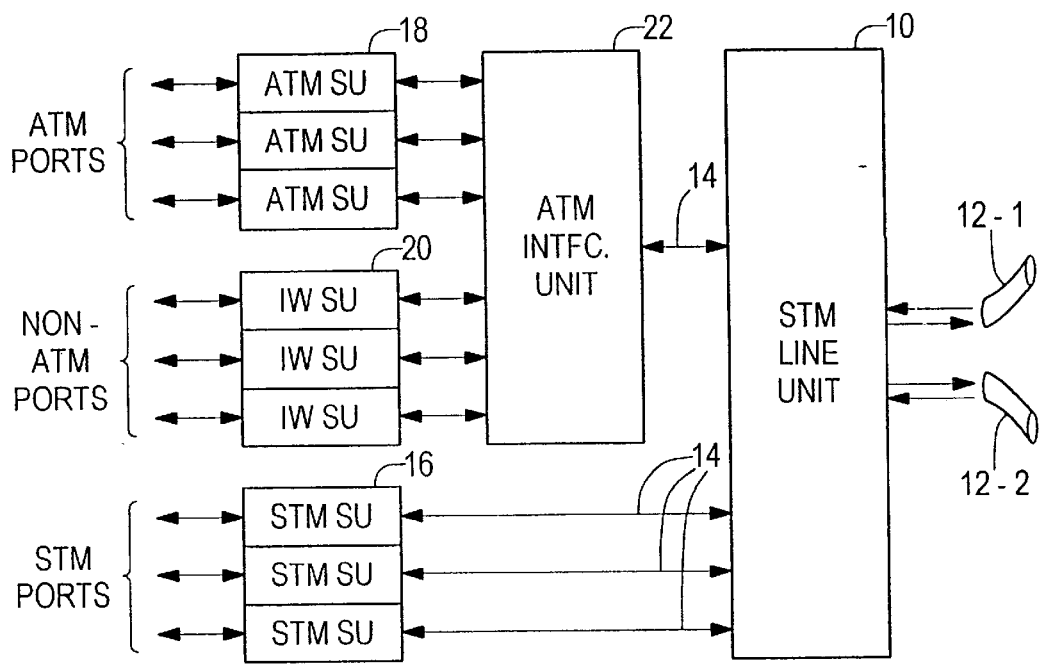
FIG. 1 is a block diagram of an ATM network access device incorporating resource partitioning functionality in accordance with the present invention.

FIG. 1 shows a network device for enabling access to an Asynchronous Transfer Mode (ATM) network running over a Synchronous Optical Network (SONET) transport network. SONET operation is provided by a Synchronous Transfer Mode (STM) line unit 10 interfacing to fiber optic cables 12-1 and 12-2. The cables 12 connect the network device to other devices in the network, for example in separate point-to-point segments or in a ring topology. The STM line unit 10 converts data signals formatted as Synchronous Transport Signal-N (STS-N, where for example N equals 1, 3 or 12), appearing on service-side ports 14, to Optical Carrier-N (OC-N, where for example N equals 3, 12 or 48) on the cables 12.

The network device includes STM service units (STM SUs) 16 that provide STM interfaces to external devices that require access to the SONET network. The STM service units 16 interface directly with the STM unit 10 via corresponding ones of the service-side ports 14.

The network device also includes ATM service units 18 and Interworking service units 20, which interface to the STM line unit 10 via an ATM interface unit 22. The ATM interface unit 22 includes ATM switch fabric logic, and provides ATM transport for the ATM service units 18 and the Interworking service units 20, via the STM unit 10 and the SONET network. The ATM service units 18 provide ATM interfaces to external ATM devices that require access to the SONET network. The Interworking service units 20 provide other types of interfaces to non-ATM devices for internetwork operations. One example of an interworking service unit is a Local Area Network (LAN) service unit, which provides Ethernet interfaces to the SONET network. As described below, the LAN service unit provides Ethernet bridge functionality and LAN emulation capability.

Figure 2:
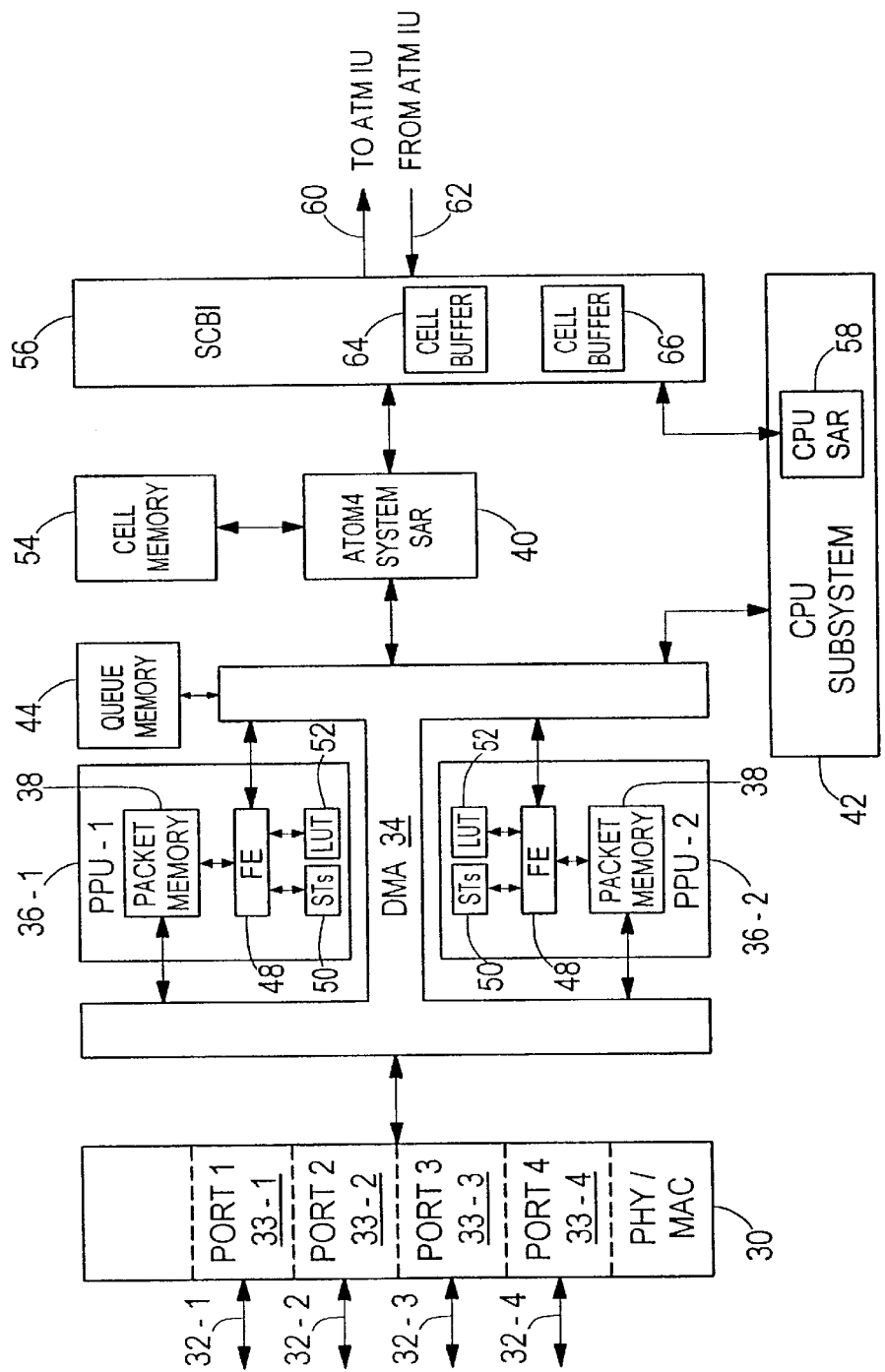
FIG. 2 is a block diagram of a LAN interworking card in the network access device of FIG. 1 in which resource partitioning functionality is provided.

FIG. 2 shows a block diagram of a LAN service unit, which is one type of interworking service unit 20. PHY/MAC circuitry 30 interfaces to four separate Ethernet transmission lines 32-1 through 32-4 via corresponding ports 33-1 through 33-4. 10BaseT or 100BaseT Ethernet frames are received by the PHY/MAC circuitry 30, and outgoing frames are transmitted in either a full or a half-duplex fashion. The PHY/MAC circuitry 30 properly terminates the transmission media 32 while providing electrical isolation between the media 32 and the remainder of the circuitry on the LAN service unit. Within each port 33, PHY circuitry performs clock and data recovery, tracks link status, and transfers received frame data to a MAC device also residing in the port 33. The MAC device checks frame validity, and identifies frames that contain errors. Partial frame data is stored in a 256 byte receive FIFO within the MAC device. The MAC device also contains a transmit FIFO for transmit buffering. The receive and transmit FIFOs for each segment 32 interface to DMA logic 34 used to transfer frames to and from other components on the LAN service unit.

The DMA logic 34 services the ports 33 on a time division multiplexed access basis. The DMA logic 34 transfers frames between the MAC FIFOs and two packet-processing units (PPUs) 36-1 and 36-2. Specifically, the DMA logic 34 transfers frames to and from packet memory 38 in each PPU 36. The DMA logic 34 contains an internal cross-connect matrix that allows for flexible assignment of Ethernet ports 33 to the PPUs 36. Each PPU 36 processes two of the four Ethernet ports 33.

The DMA logic 34 also transfers frames between the PPUs 36 and a system segmentation and reassembly (SAR) device 40, such as an AToM4+™ device available from Toshiba, Inc. The DMA logic 34 also provides a communication path between the PPUs 36 and a CPU subsystem 42.

When the DMA logic 34 receives a MAC frame from a port 33, it creates a Buffer Descriptor and places it in packet memory 38 along with the received frame. The Buffer Descriptor contains information such as Ethernet source port, frame length, error status, frame data checksum, etc. The DMA logic 34 manipulates frame pointers on queues in order to "move" the frames from one component to another. The queues are stored in a queue memory 44. The queue memory contains the following queues for each of the four Ethernet ports 33:

1. Host Receive (RX) and Transmit (TX). Used to transfer frames between the PPUs 36 and the CPU subsystem 42.
2. Ethernet RX and TX. Used to transfer frames between the PHY/MAC circuitry 30 and the PPUs 36.
3. SAR RX and TX. Used to transfer frames between the PPUs 36 and the system SAR 40.
4. Free Buffer. Used to keep track of memory buffers that may be used to store frame data.

Each PPU 36 contains a Forwarding Engine (FE) 48, which services up to two Ethernet ports 33. Logically, each FE 48 behaves as two separate processing units. Each processing unit within an FE 48 can function as either a Permanent Virtual Connection (PVC) based bridge or a LAN Emulation Client (LEC) attached bridge.

During receive frame processing, frame pointers are passed between the DMA logic 34 and the FEs 48. Each pointer corresponds to a 128-byte page of packet memory 38. The DMA logic 34 places a frame pointer on the Ethernet RX queue after a frame is fully received by the DMA logic 34. The FE 48 examines the frame pointer, performs frame processing on the corresponding data in packet memory 38, and then instructs the DMA logic 34 to move the frame pointer to the appropriate output queue, such as the SAR TX queue. The FE 48 receives only one pointer per frame to be processed. Additional pointers are stored in the DMA logic 34 for economy of pointer movement; the information the FE 48 needs for processing is contained within the first page of the frame. Once the FE 48 instructs the DMA logic 34 where to place the pointer for a completely processed frame, the DMA logic 34 moves the remainder of the pointers onto the same queue.

Receive frame processing in the FE 48 varies depending on the type of service, e.g. port mapped bridge, 802.1d bridge, or LEC attached bridge. Generally, frame processing commences with the reading of the Buffer Descriptor and MAC header information. The Buffer Descriptor tells the FE which logical processing unit should service the incoming frame, and whether the frame contains an error. During frame processing, the header portion of the frame is manipulated in packet memory 38, while the payload portion of the frame remains static.

Receive frame processing by a FE 48 is considered complete when the FE 48 updates the Buffer Descriptor and writes encapsulation data for the frame back into packet memory 38. The FE 48 updates the Buffer Descriptor by populating a Connection ID (CID) field, setting a Frame Check Sequence (FCS) status bit (preserve or drop), and indicating an offset to the start of frame data from the beginning of a buffer. The encapsulation data is used to form a corresponding frame including the frame payload for transfer over an ATM connection via the system SAR device 40, where the ATM connection to be used is indicated by the value of the CID field.

The apparatus shown in FIG. 2 is capable of implementing up to four logical bridges, two per FE 48. Each FE 48 has two associated search tables (STs) 50 and a Layer2/Layer3 lookup table (LUT) 52. Each ST 50 is a content-addressable memory (CAM) searchable by MAC address. The entries in each ST 50 contain pointers to locations in the LUT 52 associated with the same FE 48. The entries in the LUT 52 in turn contain information describing how frames whose MAC addresses match those of the corresponding ST entries should be processed. For layer 2 (i.e., bridging) processing, the LUT 52 contains the CID, encapsulation type, and other service specific data for the frame.

MAC addresses are retrieved from the packet memory 38 and searched for in the corresponding ST 50. If a pointer to the LUT 52 is present, it is used to retrieve the CID and other information from the LUT 52. This information is used to create the encapsulation data written back into packet memory 38 for the frame. Once frame processing is complete, the frame is placed on the SAR TX Queue to be transferred to the system SAR 40.

There are several exceptions to the above processing scenarios. These exceptions are as follows:
1. Pointers for frames containing errors are returned to the DMA logic 34 by the FE 48. No frame processing is performed by the FE 48. The DMA logic 34 returns the frame pointers to the Free Buffer Queue.
2. The search table lookup indicates that the current frame should be filtered. The frame is discarded by the FE 48.
3. The search table lookup indicates that the frame is destined for the CPU subsystem 42, also referred to as the Host. Bridge Protocol Data Units (BPDUs) are one type of frame that are destined for the Host. In this case, frame data is placed on the Host RX queue rather than the SAR TX queue.
4. The search table lookup indicates a "no match" condition, i.e., the search table has no LUT pointer for the MAC address being looked up. The resulting action depends on the type of service at the port. For PVC bridging, the LUT is consulted for a CID of a broadcast Virtual Connection (VC). This CID is placed in the Buffer Descriptor, and the frame is transferred to the system SAR 40 to be sent on the broadcast VC. For LAN Emulation (LANE) bridging, the frame is transmitted to the system SAR 40 to be sent to a Broadcast and Unknown Server (BUS) in the emulated LAN, and additionally an address resolution process is carried out to obtain a mapping between the MAC address and a VC. Subsequent frames containing the MAC address are forwarded onto the VC to which the MAC address is mapped.

Frames destined for the ATM/SONET network are placed on the SAR TX queue for transfer to the system SAR 40. There are four SAR TX queues, one for each Ethernet port 33 (or one per bridge instance). Frames from each SAR TX queue are time-division multiplexed into a single input queue within the system SAR 40. The system SAR 40 segments the frames and stores them as groups of ATM cells on VC queues within a cell memory 54.

In the illustrated embodiment, the cell memory 54 has 4 MB of storage. Each VC queue in the cell memory 54 has a programmable list size, so that the available buffer space can be flexibly assigned among the VCs. The sum total of list sizes for all VCs within a given Virtual Path (VP) can be larger than the total amount of memory space allocated to the VP, in order to provide statistical buffer gain. Once a VC queue reaches its programmed limit within the system SAR 40, subsequent frames destined for that VC are dropped. In addition, once the entire space allocated to a given VP is full, subsequent frames are dropped. The per-VP allocation and use of the cell memory 54 is described in more detail below.

SCBI logic 56 (where SCBI stands for SAR Coprocessor Backplane Interface) provides an interface between the LAN service unit and the ATM interface unit 22 of FIG. 1. The SCBI logic 56 has one interface to the system SAR 40, and another interface to the CPU subsystem 42. In the illustrated embodiment, these interfaces conform to the UTOPIA standard, which specifies a multi-bit interface that provides efficient transfer of ATM cell data. The CPU subsystem 42 contains its own SAR 58 to facilitate the segmentation and reassembly of frames on multiple VCs required by software executing in the CPU subsystem 42. In a preferred embodiment, the CPU subsystem 42 employs the MPC860SAR microprocessor manufactured by Motorola, Inc.

For Ethernet sourced traffic, the SCBI logic 56 receives cells from the system SAR 40 and transmits them on a high-speed serial transmission line 60 to the ATM Interface Unit 22 of FIG. 1. The SCBI logic 56 also receives cells from the CPU subsystem 42, via the CPU SAR 58, and transmits these cells on the transmission line 60 to the ATM Interface Unit 22.

Cell-based traffic is received from the ATM interface unit 22 over a high-speed serial transmission line 62. The SCBI logic 56 extracts the VPI/VCI and PT (Payload Type) fields of the incoming cells, and uses these values as inputs to a table whose entries indicate the cell type. The action taken depends on the cell type, as follows:
1. A user data cell is translated through a VC Translation Table and stored in a cell buffer 64 for forwarding to the system SAR 40.
2. A LAN emulation control frame (as opposed to an in-band frame) is placed untranslated into a cell buffer 66 for forwarding to the CPU subsystem 42.
3. Management cells are placed untranslated into the cell buffer 66 for forwarding to the CPU subsystem 42.

The system SAR 40 performs AAL5 reassembly of frames from the cells it receives, and checks the integrity of the reassembled frames. In particular, the system SAR 40 checks for and flags the following conditions: (1) frames too large; (2) frames having lengths different from the AAL5 frame length field; and (3) frames having CRC errors. Reassembled frames are placed in frame lists at the frame interface of the system SAR 40. The system SAR 40 attaches a CID, an Encapsulation Type field, and a Bridge ID to the beginning of each frame on the list. These fields are set up within the system SAR 40 by operating software when a new VC is provisioned within the system. The frames and frame lists are stored in the cell memory 54.

The DMA logic 34 transfers frames out of the system SAR 40 in a time division multiplexed access manner. From each frame, the DMA logic 34 forms a Buffer Descriptor based on the CID, Encapsulation Type, Bridge ID, frame length, and the fact that the frame entered from the ATM side of the LAN service unit. The frame is placed on the SAR RX queue for the appropriate logical bridge.

The PPU 36 that receives the frame from the DMA logic 34 processes the frame in a similar manner as for frames received from the Ethernet side. The frame may be destined for an Ethernet port 33 or Host software executing in the CPU subsystem 42. Each outgoing frame encountering a "no match" condition is simply forwarded to the Ethernet port 33 associated with the bridge. Decapsulation processing for multiprotocol encapsulation per RFC 1483 and LANE bridging is performed. Processed frames are placed on either the appropriate Ethernet TX Queue or the Host RX Queue.

The DMA logic 34 forwards outgoing frames to the MAC controllers in the respective ports 33 within the PHY/MAC circuitry 30. Each MAC controller contains a 256-byte transmit FIFO used to buffer outgoing frames. The DMA logic transfers frames into the transmit FIFO from the packet memory 38. Whenever data is available in a MAC transmit FIFO, the corresponding PHY transmits the data onto the Ethernet media 32.

Figure 3:
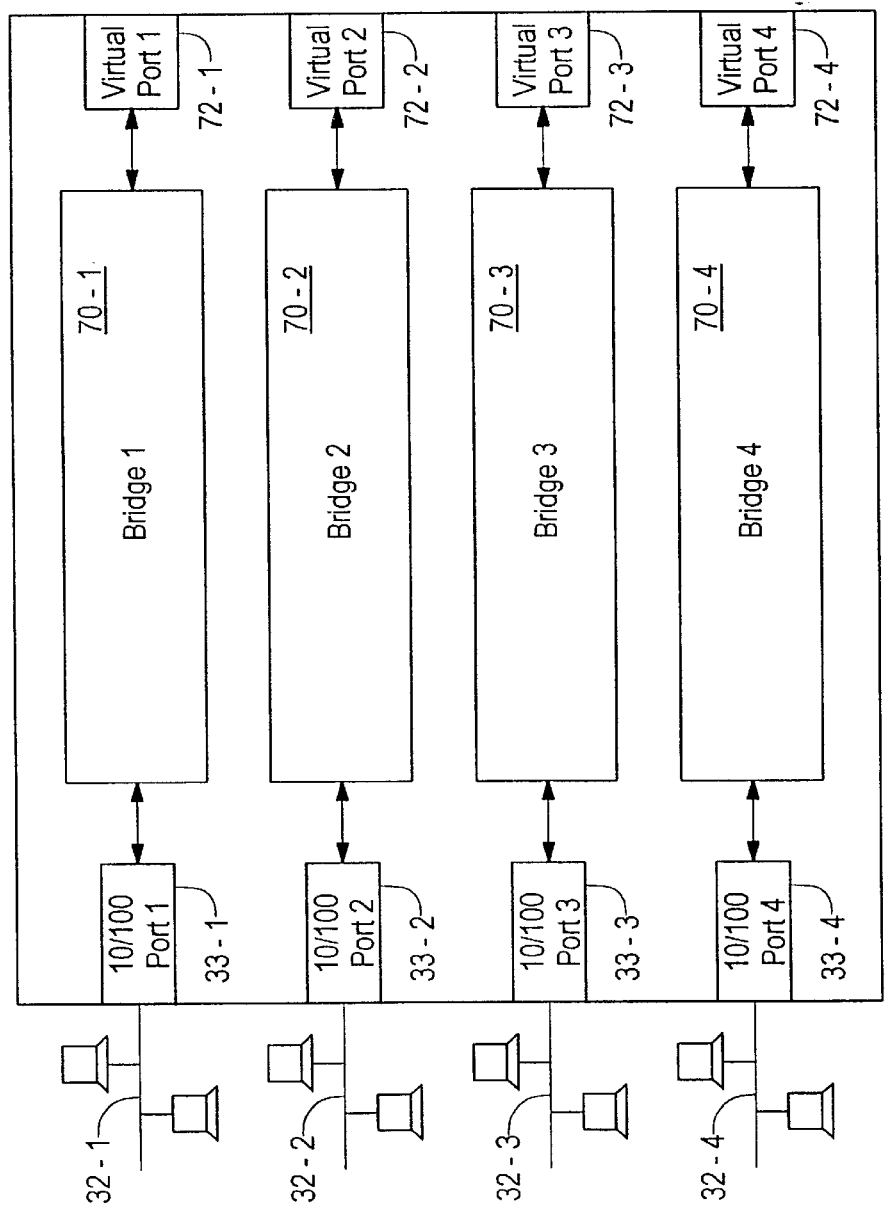
FIG. 3 is a block diagram illustrating functional partitioning of the LAN interworking card of FIG. 2 into separate LAN bridges.

FIG. 3 illustrates the functional partitioning of the LAN card 20 into up to four Ethernet bridges 70-1 through 70-4. Each bridge 70 has an interface to a corresponding Ethernet port 33, and an interface to a corresponding virtual port 72. As described below, each virtual port 72 includes a group of ATM virtual connections (VCs) identified by a programmable VPI value and a set of up to 256 VCI values, along with mechanisms for segmenting and reassembling Ethernet frames into/from ATM cells and transferring the cells to and from the ATM interface unit 22 on the connections of the corresponding group. From the ATM side of the LAN card 20, each bridge 70 and associated virtual port 72 appears as a separate Closed User Group (CUG). Each virtual port 72 has separately allocated buffers and bandwidth for the transfer of cells to and from the ATM interface unit 22. Consequently, the bridges 70 operate substantially independently of each other. In particular, a given bridge 70 cannot use the buffer and bandwidth resources devoted to another bridge 70. It is thus possible to devote separate bridges 70 to different network customers, for example, while maintaining desired separation among different customers for security, performance management, and other network management purposes.

Figure 4:
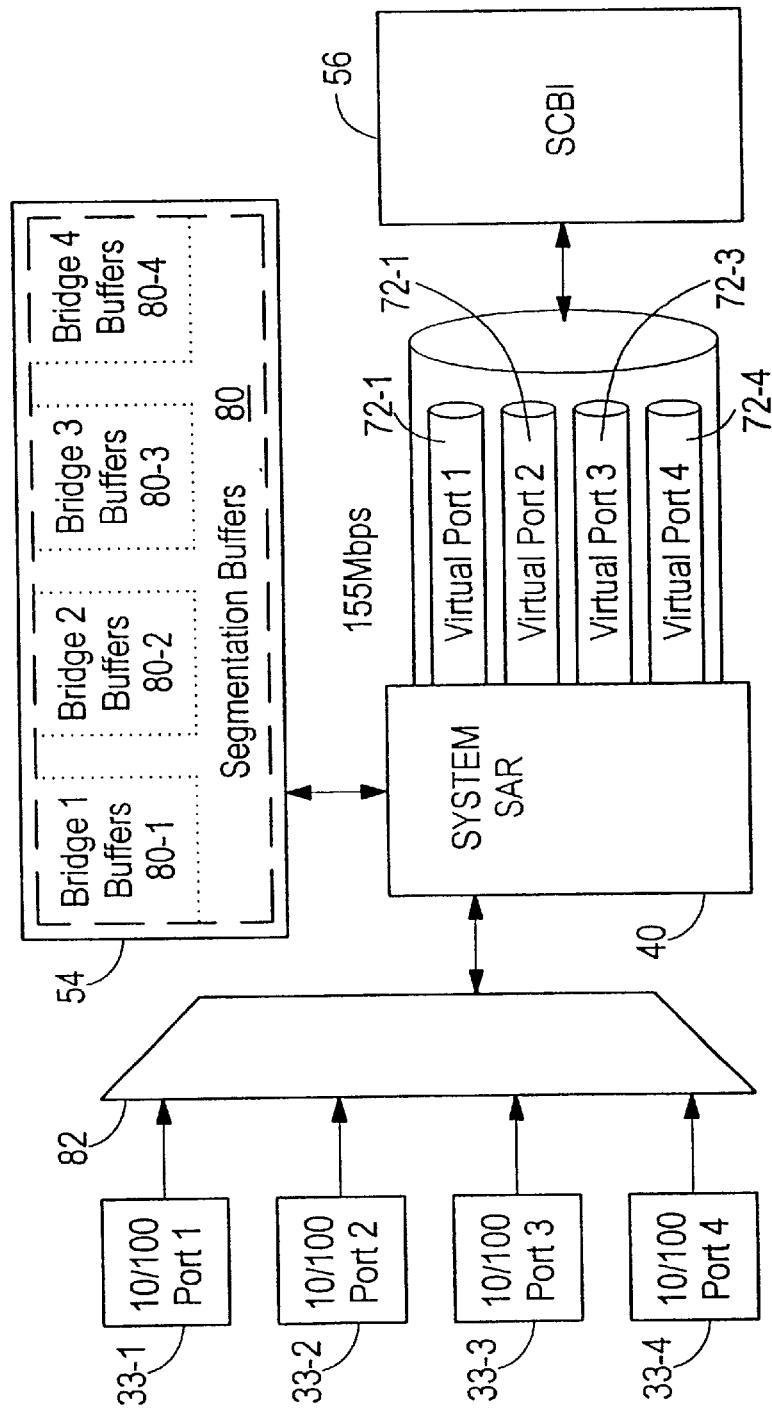
FIG. 4 is a block diagram illustrating the partitioning of a segmentation buffer and segmentation bandwidth on the LAN interworking card of FIG. 2 among the different bridges of FIG. 3.

FIG. 4 illustrates functional aspects of the components shown in FIG. 2 to implement the multi-bridge scheme of FIG. 3. For convenient reference, much of the functionality of the DMA logic 34 and the PPUs 36 discussed above with reference to FIG. 2 is shown in FIG. 4 as a mapper/mux function 82. For incoming Ethernet traffic of the four bridges 70, the mapper/mux function 82 maps the received frames to respective connection identifiers (CIDs) recognized by the system SAR 40, and forwards the frames and their associated CIDs to the system SAR 40. For outgoing Ethernet traffic, the mapper/mux function 82 receives frames and CIDs from the system SAR 40, creates corresponding Ethernet frames, and forwards these frames to the correct port 33.

FIG. 4 also illustrates that the separate virtual ports 72-i of FIG. 3 are defined at the interface between the system SAR 40 and the SCBI logic 56. Each virtual port 72 has a corresponding unique VPI by which it is identified within the system SAR 40. The manner in which the VPIs are assigned and utilized is described below with reference to FIG. 5 and FIG. 6.

As shown in FIG. 4, the cell memory 54 contains up to four segmentation buffers 80-1 through 80-4, each being associated with a corresponding one of the bridges 70-1 through 70-4. The segmentation buffers 80 are used by the system SAR 40 to segment frames into groups of cells for sending on the ATM network to which the ATM IU 22 interfaces. The aggregate storage space of the segmentation buffers 80 is 2 Mbytes, which can be allocated to the separate individual segmentation buffers 80-i in a programmable fashion within the system SAR 40. For example, the segmentation buffer 80-1 for bridge 1 70-1 may occupy 1 MB, while the remaining segmentation buffers 80-2 through 80-4 may each occupy ⅓ MB each. Segmentation buffer space is allocated in accordance with the desired performance characteristics of the respective bridges 70.

Space in the segmentation buffers 80 is allocated in 53-byte increments referred to individually as "cell buffers". The size of each buffer 80-i is established by a corresponding buffer size limit programmed into the system SAR 40. The buffer size limit for each segmentation buffer 80-i specifies the maximum number of cell buffers that may be occupied at any time for the corresponding bridge 70-i. The system SAR 40 maintains a buffer size count for each buffer 80-i, which tracks the actual number of cell buffers occupied for the corresponding bridge 70-i at any given time. When a frame is received by the system SAR 40 for a given bridge 70-i, the buffer size count for the bridge is checked to determine whether the frame can be accepted. If the buffer size count is less than the buffer size limit by at least the number of cells in a maximum-size frame, then the frame is accepted for segmentation and forwarding over the ATM network. Otherwise, the frame is discarded, and an appropriate error indication is provided. When a frame is accepted for segmentation, the buffer size count is incremented by one for each cell buffer needed to segment the frame. The buffer size count is decremented by one for each cell transferred from the segmentation buffer to the SCBI logic 56 for transmission on the ATM network.

Within each VPI, up to 256 VCs may be used to identify separate virtual connections. Buffer space for individual VCs within a VPI is separately allocable. However, the VC buffer space can be overbooked within a VPI as desired to increase performance. For example, if the size of the segmentation buffer 80-1 for the bridge 70-1 is 1 Mbyte, then it is possible to set the VC buffer limit for all the VCs within the associated VPI to values up to 1 Mbyte. This feature provides statistical buffer gain within a Virtual Path (VP) without affecting the other VPs.

Figure 5:
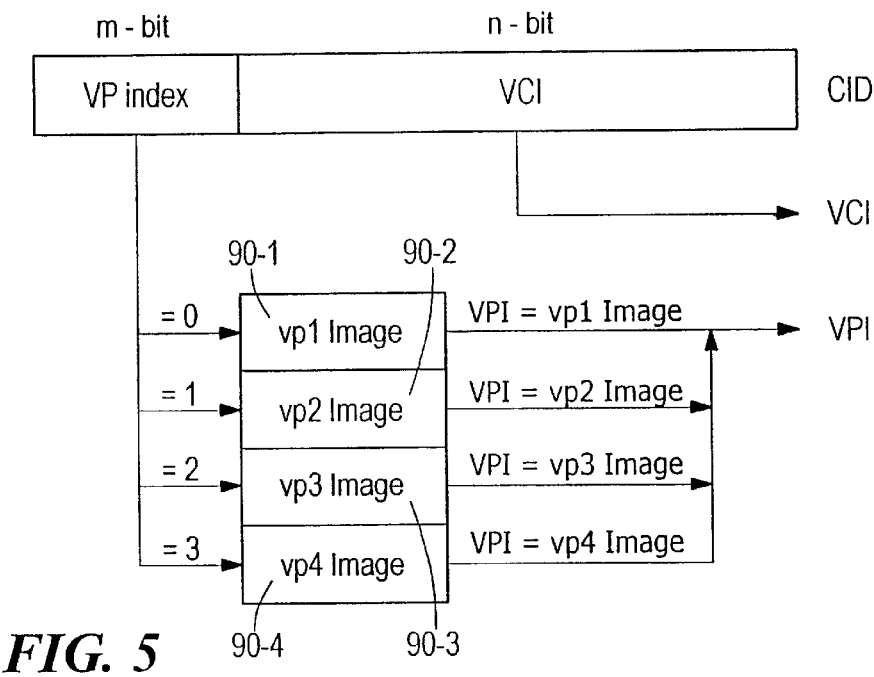
FIG. 5 is a diagram illustrating the mapping of a Virtual Path (VP) index to one of four Virtual Path Identifiers (VPIs) in the LAN interworking card of FIG. 2.
Figure 6:
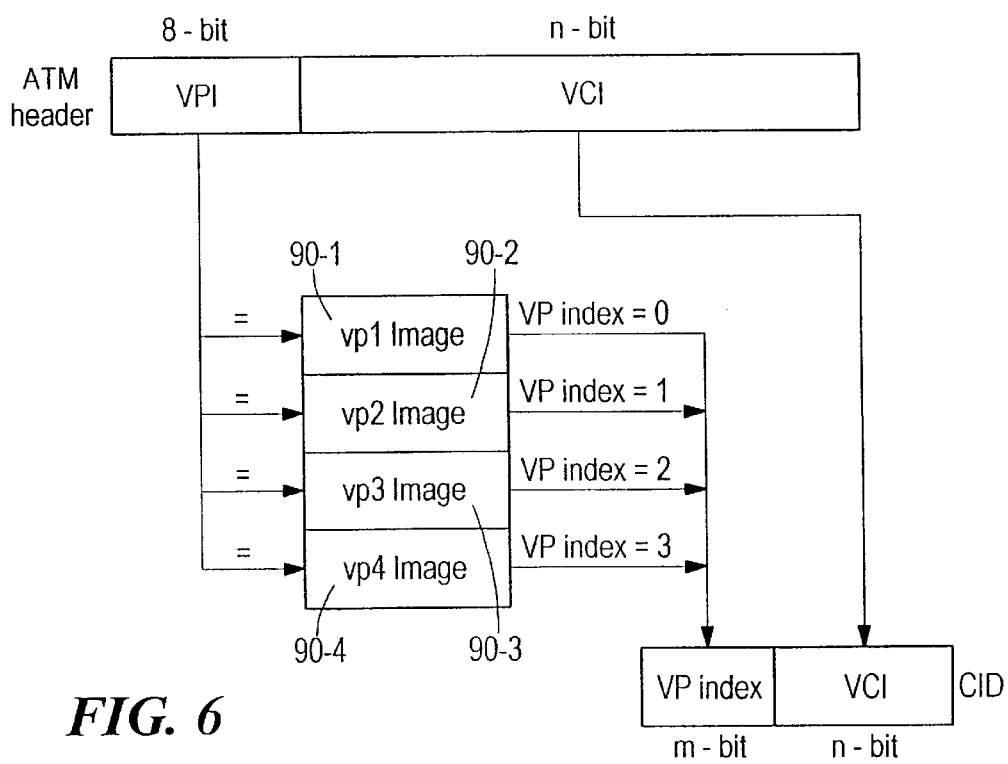
FIG. 6 is a diagram illustrating the mapping of a VPI to a VP index in the LAN interworking card of FIG. 2.

FIG. 5 and FIG. 6 show the mapping between a CID and a VPI/VCI pair used to identify a connection. The CID is used by both the mapper/mux function 82 and the system SAR 40 to identify connections, and the VPI/VCI pair are used by the system SAR 40 and the SCBI 56. The CID contains a 2-bit index value VPindex that identifies one of four VPIs configured within the system SAR 40 for the different bridges 70. The configured VPI values are labeled "vpXImage" (x=1, 2, 3 or 4), and these are stored in respective registers 90-1 through 90-4. The CID also contains a Virtual Channel Identifier (VCI) identifying one of 256 channels within each bridge's VP. For frames to be segmented for transmission on the ATM network (FIG. 5), the VPindex is used to select a vpXImage value for use in VPI field of the header of cells transferred to the SCBI logic 56. The VCI value is simply copied from the CID to the outgoing cell header. For reassembled frames (FIG. 6), the VPI value in the header of the received cells is compared with the four vpXImage values, and the index of the matching value is used in the VPindex field of the CID passed from the system SAR 40 to the mapper/mux function 82. The VCI value is simply copied from the received cells to the CID.

The system SAR 40 supports up to four VPs, the actual number being a configuration parameter. In addition, the system SAR 40 can be configured to support a maximum of either 1024 (1K) or 4096 (4K) VCs for segmentation and reassembly functions. The following table shows the number of VPindex bits (m) and VCI bits (n) appearing in the CID as a function of the number of configured VPs and the number of VCs.

| No of VPs | m | n (1K) | n (4K) |
|---|---|---|---|
| 1 | 0 | 10 | 12 |
| 2 | 1 | 9 | 11 |
| 3 or 4 | 2 | 8 | 10 |

For flexibility, the VPI and VCI values used to identify connections between the system SAR 40 and the SCBI logic 56 are allowed to be different from the VPI and VCI values used between the SCBI logic 56 and the ATM IU 22. The SCBI logic 56 is responsible for translating between the two sets of VPI/VCI values.

The system SAR device 40 of FIG. 2 services up to four constant bit rate (CBR) VPs. Each VP is represented by a VPIindex as described above, and each VP can have up to 4095 cell queues. Each cell queue of a CBR VP is served with either a round-robin of all available bit rate (ABR) and UBR connections with cells to send, or according to a pre-computed traffic schedule for CBR connections, or according to a pre-computed traffic schedule and a "token-bucket" scheme for VBR connections. The "token-bucket" scheme controls the sustained rate of a non-ABR virtual connection. Overall, the entire link bandwidth is partitioned among served CBR VPs, which are represented by slots in the traffic schedule. The traffic scheduling scheme controls the minimum guaranteed peak rate and the peak rate of CBR and VBR virtual connections.

Figure 7:
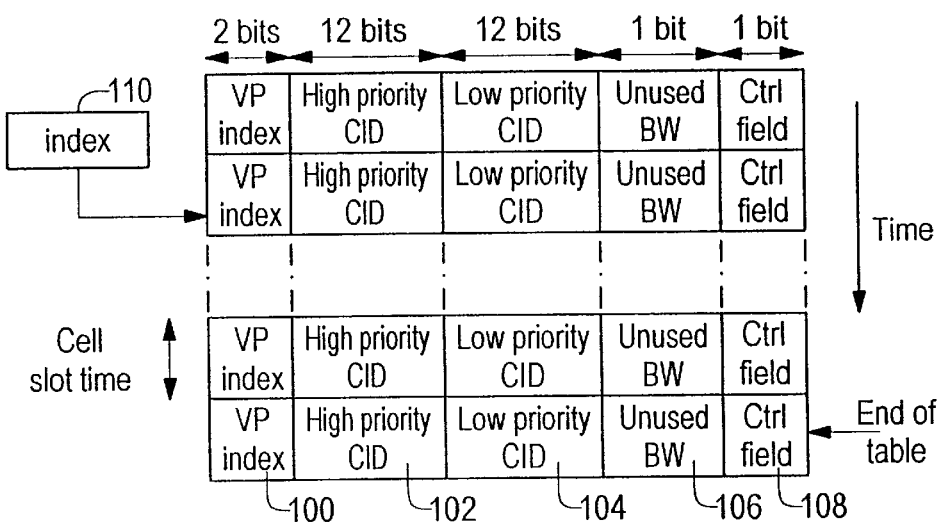
FIG. 7 is a representation of a scheduling table used for scheduling the transmission of cells in the LAN interworking card of FIG. 2.

FIG. 7 shows a logical representation of a cell transmission schedule table maintained and used by transmit scheduling logic within the system SAR. Each row in the table contains a VP index field 100, a high priority CID field 102, a low priority CID field 104, an unused bandwidth (BW) flag field 106, and a control field 108. The VP index field 100 identifies one of up to four VPIs associated with different bridges, as described above. The high priority CID field 102 identifies a connection on which CBR service is being provided. The low priority CID field 104 identifies a connection on which variable bit rate (VBR) service is being provided. The unused BW field 106 is used to indicate that no VP can use the send opportunity represented by the row, in order to control total bandwidth consumed by all VPs. An unassigned cell or idle cell is sent when such rows are encountered. The control field 108 contains a flag indicating the last entry in the schedule table when set. The system SAR 40 returns to the first entry in the table when an entry having the control field flag 108 set is encountered.

The system SAR continually increments a schedule index 110 to step through the rows of the schedule table. When the schedule index 100 points to a given row, it represents a "send-cell opportunity" for the VP indicated by the VP index field 100 of the row (also referred to below as the "current VP"). The number of rows for a given VP in the schedule table represents the guaranteed peak rate for that VP.

The high priority CID field 102 and low priority CID field 104 in each row provide up to 2 non-ABR and non-UBR connections of the current VP with a potential send opportunity, at a higher priority than ABR or UBR connections of the VP. The CID in the high priority CID field 102 is served first. If there is no service required by this CID, the opportunity is passed to the CID in the low priority CID field 104. Hence, the number of rows in which a given CID appears in the high priority CID field 102 represents the minimum guaranteed peak rate for a connection.

If no service is required for the CID in the low priority CID field 102, the send opportunity is passed to the ABR connections of the VP, and from there to unspecified bit rate (UBR) connections of the VP, until a connection makes a claim and sends a cell. If no connection of the current VP has anything to send, an "unassigned cell" is transmitted. The schedule index 110 is then incremented, and points to the next row of the VP that can legally send a cell for the next cell time.

The number of rows in the schedule table determines the granularity with which bandwidth is assigned among the VPs and connections, with the maximum number of rows being 3392. The characteristics of the traffic shaper are determined by the algorithm used to fill out the traffic schedule table.

The average (sustained) rate of cell transmission and burst size for each VBR connection can be controlled by a "token-bucket" scheme. A number of tokens are given to each connection at some periodic refresh interval, in accordance with a predetermined credit increment associated with the connection. Each time a cell is sent, the number of tokens is decremented by one. If the connection has no tokens, it cannot send a cell. The number of tokens that are refreshed determines the burst size, i.e., the maximum number of cells that can be sent at the peak rate. Thus, the credit increment and the refresh interval together determine the average (sustained) cell rate.

A cell is transmitted using the following steps:
I. Per the above scheduling function, a connection having a cell to transmit is found. If none is found, an unassigned cell or idle cell is transmitted, as described above.
II. When a non-idle cell is to be transmitted, it is confirmed that (i) the connection is valid, (ii) there are some tokens or credits for this connection if the traffic type is VBR, ABR or flow controlled CBR.
III. The cell is moved to a transmit FIFO to be send to the SCBI logic 56.
IV. Transmit state information associated with the cell is updated.

Techniques for the partitioning of shared resources in a network access device have been shown. It will be apparent to those skilled in the art that other modifications to and variations of the above-described techniques are possible without departing from the inventive concepts disclosed herein. Accordingly, the invention should be viewed as limited solely by the scope and spirit of the appended claims.

What is claimed is:
1. Apparatus, comprising:
 a plurality of local area network (LAN) interface logic blocks, each LAN interface logic block being operative to send and receive LAN frames to and from a corresponding different LAN;
 cell-based-network interface logic operative to send and receive cells to and from a cell-based network;
 a cell buffer memory; and segmentation and reassembly (SAR) logic coupled to the LAN interface logic blocks, the cell buffer memory, and the cell-based-network interface logic, the SAR logic being operative to programmably partition the cell buffer memory into distinct buffer regions, each buffer region being associated with a respective LAN and with a respective set of virtual connections defined between the SAR logic and the cell-based-network interface logic, the SAR logic being operative to segment PDUs received from each LAN interface logic block into corresponding groups of cells and to store each group of cells into the buffer region associated with the respective LAN, the SAR logic being further operative to transfer the groups of cells from each buffer region to the cell-based-network interface logic via the virtual connections associated with the buffer region.

2. Apparatus according to claim 1, wherein each set of virtual connections is identified by a respective virtual path identifier (VPI) used in the header of cells containing data from the corresponding LAN, and wherein each VPI is mapped to a respective index value included in connection identifiers passed between the LAN interface logic blocks and the SAR logic to identify the respective buffer regions and sets of virtual connections.

3. Apparatus according to claim 1, wherein each set of virtual connections is identified by two generally different virtual path identifiers (VPIs), one VPI appearing in the header of cells transferred from the SAR logic to the cell-based-network interface logic, and the other VPI appearing in the header of cells transferred over the cell-based network, and wherein the cell-based-network interface logic is operative to translate between the two different VPI values for each set of virtual connections.

4. Apparatus according to claim 1, wherein each LAN interface logic block implements a bridge between the respective LAN and a respective virtual port including the respective virtual connections.

* * * * *